(12) United States Patent
Weidinger

(10) Patent No.: US 6,591,957 B2
(45) Date of Patent: Jul. 15, 2003

(54) PRESSURE PLATE ASSEMBLY AND PRETENSIONING SPRING FOR A PRESSURE PLATE ASSEMBLY

(75) Inventor: Reinhold Weidinger, Kolitzheim (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/965,047

(22) Filed: Sep. 27, 2001

(65) Prior Publication Data

US 2002/0079186 A1 Jun. 27, 2002

(30) Foreign Application Priority Data

Sep. 30, 2000 (DE) .......................................... 100 48 555

(51) Int. Cl.[7] .............................................. F16D 13/75
(52) U.S. Cl. ................................ 192/70.25; 192/111 A; 267/167
(58) Field of Search ......................... 192/70.25, 111 A; 267/169, 167, 179, 180; 29/896.9, 896.91

(56) References Cited

U.S. PATENT DOCUMENTS

| | | | | |
|---|---|---|---|---|
| 1,565,822 A | * | 12/1925 | Smith | ......................... 267/136 |
| 4,207,972 A | * | 6/1980 | Zeidler | ..................... 188/79.63 |
| 5,404,979 A | * | 4/1995 | Craft et al. | ............... 192/111 A |
| 5,409,091 A | * | 4/1995 | Reik et al. | ............... 192/107 C |
| 5,513,735 A | * | 5/1996 | Uenohara | ................ 192/111 A |
| 5,564,541 A | * | 10/1996 | Gochenour et al. | ....... 192/111 A |
| 5,791,448 A | * | 8/1998 | Gochenour et al. | ....... 192/111 A |
| 6,053,297 A | * | 4/2000 | Kummer | .................. 192/111 A |
| 6,109,412 A | * | 8/2000 | Cole et al. | ................. 192/111 A |

FOREIGN PATENT DOCUMENTS

DE    197 12 888    3/1997    ........... F16D/13/75

* cited by examiner

Primary Examiner—Saul Rodriguez
(74) Attorney, Agent, or Firm—Cohen, Pontani, Lieberman & Pavane

(57) ABSTRACT

A pressure plate assembly for a friction clutch includes a housing arrangement; a pressure plate held in the housing arrangement with freedom to rotate in the same direction as that in which a rotational axis extends; a stored-energy element; and a wear-compensating device, acting in the path of force transmission between the stored-energy element and the pressure plate and/or between the stored-energy element and the housing arrangement, where the wear-compensating device has at least one adjusting element which can be moved in an adjusting direction to compensate for wear and at least one spring element, which pretensions the minimum of one adjusting element for movement in the adjusting direction, where at least certain areas of the minimum of one spring element extend in the circumferential direction relative to the rotational axis, and where the minimum of one spring element is provided with a support arrangement, which passes through at least certain areas of the spring element, the support arrangement being an integral part of the spring element.

8 Claims, 4 Drawing Sheets

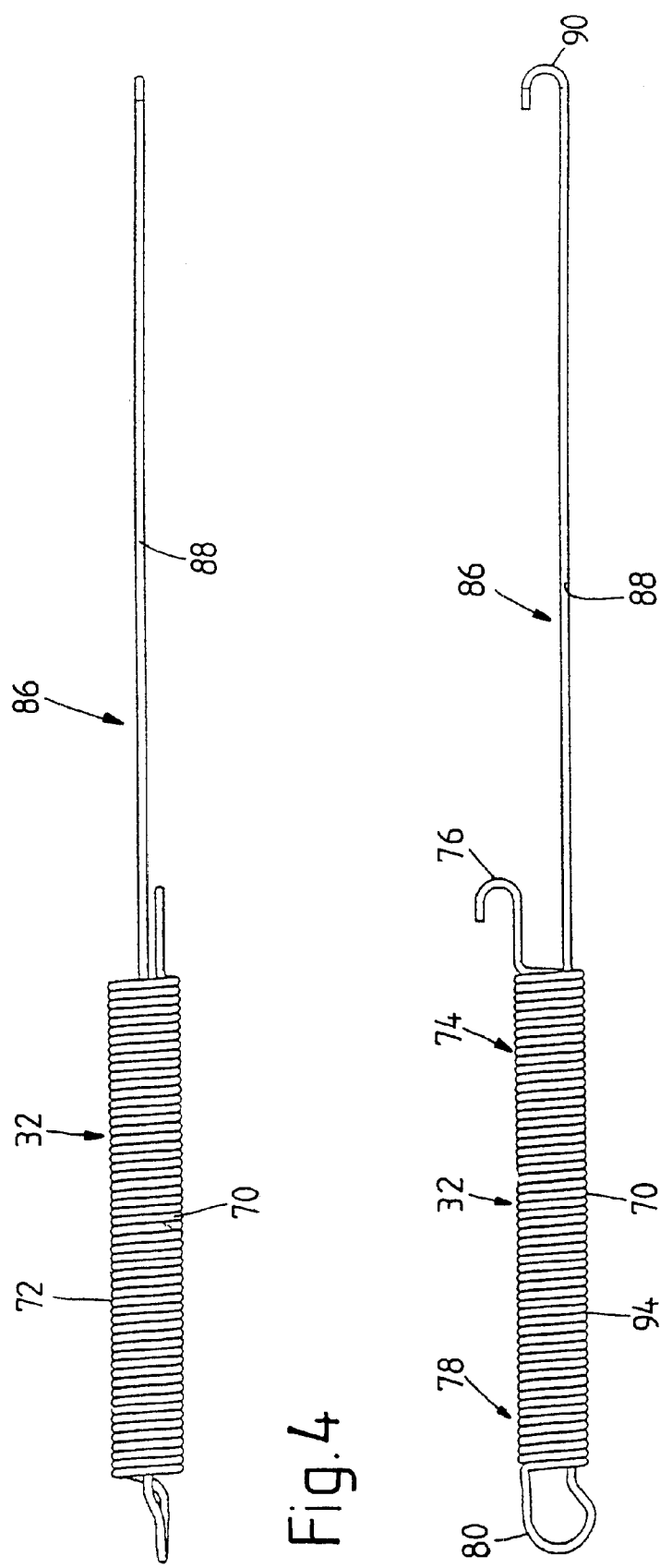

PRESSURE PLATE ASSEMBLY AND PRETENSIONING SPRING FOR A PRESSURE PLATE ASSEMBLY

BACKGROUND OF THE INVENTION

1. Field of the Invention

The present invention relates to a pressure plate assembly for a friction clutch, comprising a housing arrangement; a pressure plate held in the housing arrangement with freedom to move in the same direction as that in which a rotational axis extends; a stored-energy element; a wear-compensating device acting in the path of force transmission between the stored-energy element and the pressure plate and/or between the stored-energy element and the housing arrangement, where the wear-compensating device has at least one adjusting element which can move in an adjusting direction to compensate for wear; and at least one spring element, which pretensions the minimum of one adjusting element for movement in the adjusting direction, where at least certain areas of the minimum of one spring element extend in the circumferential direction with respect to the rotational axis, and where the minimum of one spring element is provided with a support arrangement, which passes through at least certain areas of the spring.

2. Description of the Related Art

A pressure plate assembly in which the wear-compensating device has two adjusting rings which can be shifted in the circumferential direction with respect to each other is known from DE 197-12,888 A1. A helical tension spring is provided; the body of this helical spring with the helical turns extends along the inside circumferential surface of the adjusting rings; the first end of the spring has a connecting section, which is connected to one of the adjusting rings. The second end has a connecting section, which is used to connect the body of the helical spring to the pressure plate. Because this helical tension spring is relatively long in the circumferential direction, it is supported by appropriate support elements on both the radially inner and the radially outer sides. The support on the radially outer side in particular is accomplished by means of a separate support plate, provided on the pressure plate, which ultimately has the task of preventing the turns of the body of the helical spring from digging into the adjusting rings under the effect of centrifugal force while the clutch is operating in rotational mode. The provision or installation of a support plate such as this leads to increased cost and to extra labor.

A pressure plate assembly in which an adjusting element acting between the housing assembly and the stored-energy element is also under the action of a spring element is known from U.S. Pat. No. 5,409,091. The spring element is designed as a helical compression spring extending in the circumferential direction; a first connecting section is supported on the housing assembly, and the second connecting section is supported on a driver section cooperating with the adjusting element. A mandrel-like projection, formed as an integral part of the housing assembly and extending in the circumferential direction, passes all the way through the helical spring body of the spring element and thus supports the spring element especially in the radial direction.

SUMMARY OF THE INVENTION

An object of the present invention is to provide a pressure plate assembly in which the spring element which puts the wear-compensating device under pretension can be given radial support by simple measures.

According to the invention, the object is accomplished by a pressure plate assembly for a friction clutch, comprising a housing arrangement, a pressure plate held in the housing arrangement with freedom to move in the same direction as that in which a rotational axis extends, a stored-energy element, and a wear-compensating device acting in the path of force transmission between the stored-energy element and the pressure plate and/or between the stored-energy element and the housing arrangement, where the wear-compensating device has at least one adjusting element which can move in the adjusting direction to compensate for the wear and at least one spring element, which pretensions the minimum of one adjusting element for movement in the adjusting direction, where at least certain areas of the minimum of one spring element extend in the circumferential direction relative to the rotational axis, and where the minimum of one spring element is provided with a support arrangement, which passes at least through certain areas of the spring element.

It is also provided in accordance with the invention that the support arrangement is an integral part of the spring element.

In a departure from the approach followed in accordance with the state of the art, the present invention takes the route of integrating the support arrangement for the minimum of one spring element into the spring element itself. As a result, there is no need to make any changes to other components or to take special design measures on other components such as the housing arrangement or the pressure plate to obtain the desired circumferential support. This means, first, that it becomes much easier to produce a pressure plate assembly according to the invention and, second, that the design of the various components of the pressure plate assembly, especially the housing arrangement and the pressure plate, can be optimized with respect to other aspects, independently of the support measures to be provided for the minimum of one spring element.

For example, it can be provided that the minimum of one spring element has a helical spring body of plural spring turns with a first connector at a first end of the body and a second connector at a second opposite end of the body, the first and second connectors emerge from the spring turns at the corresponding two ends of the spring body. A section of material which essentially constitutes the support arrangement and which passes through the body of the helical spring emerges from one of the first and second connectors. Because spring elements of this type can usually be formed by bending pieces of spring steel wire, it is possible in this way, by providing an extended section of material which has no turns but which is instead surrounded by the turns of the body of the helical spring, to provide the required support.

It is also preferable for the section of material to extend beyond the first end and to have a third connector facing away from the second end, the third connector, e.g., being at a tip end of the material section. To prevent the occurrence of additional undesirable frictions or deformations in the area of the support arrangement or of the material section during operation, it is proposed that the third connector of the material section be connected to the same component as that to which the second connector is connected.

In the preferred embodiment of the pressure plate assembly according to the invention, it can be provided that the minimum of one adjusting element has an adjusting ring, which can be moved in the circumferential direction around the rotational axis to make the wear-compensating adjustment, and that the body of the helical spring of the minimum of one spring element extends in the circumferential direction along, or in the area of, the adjusting ring.

To prevent in particular a spring element of this type from digging into the adjusting device under the effect of centrifugal forces, it is proposed that the minimum of one spring element be located radially inside the adjusting ring and that the material section extend along a radially inner area (relative to the rotational axis) of the body of the helical spring of the minimum of one spring element.

The pressure plate assembly according to the invention can also be designed in such a way that the wear-compensating device acts between the pressure plate and the stored-energy element, and that the first connector of the minimum of one spring element is connected to the minimum of one adjusting element, whereas the second connector is connected to the pressure plate.

According to another aspect, the present invention pertains to a pretensioning spring for a pressure plate assembly with a wear-compensating device, which spring comprises a helical spring body of plural spring turns with a first connector at one end of the body and a second connector at a second opposite end of the body. A material section which emerges from one of the first and second connectors passes through the body of the helical spring. The material section has a third connector facing away from the spring body second end and located distal said body second end and said second connector. For example, the material section can emerge from the first connector, pass through the turns of the body and extend in a run a distance beyond the second connector, the third connector being at the tip end of the run.

The present invention also pertains to a friction clutch comprising at least one pretensioning spring according to the invention.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 4 shows a pretensioning spring in the relaxed state, installed in the pressure plate assembly according to the invention; and FIG. 5 shows the pretensioning spring of FIG. 4 as seen looking in direction V of FIG. 4.

DETAILED DESCRIPTION OF THE PRESENTLY PREFERRED EMBODIMENTS

Figure 1:
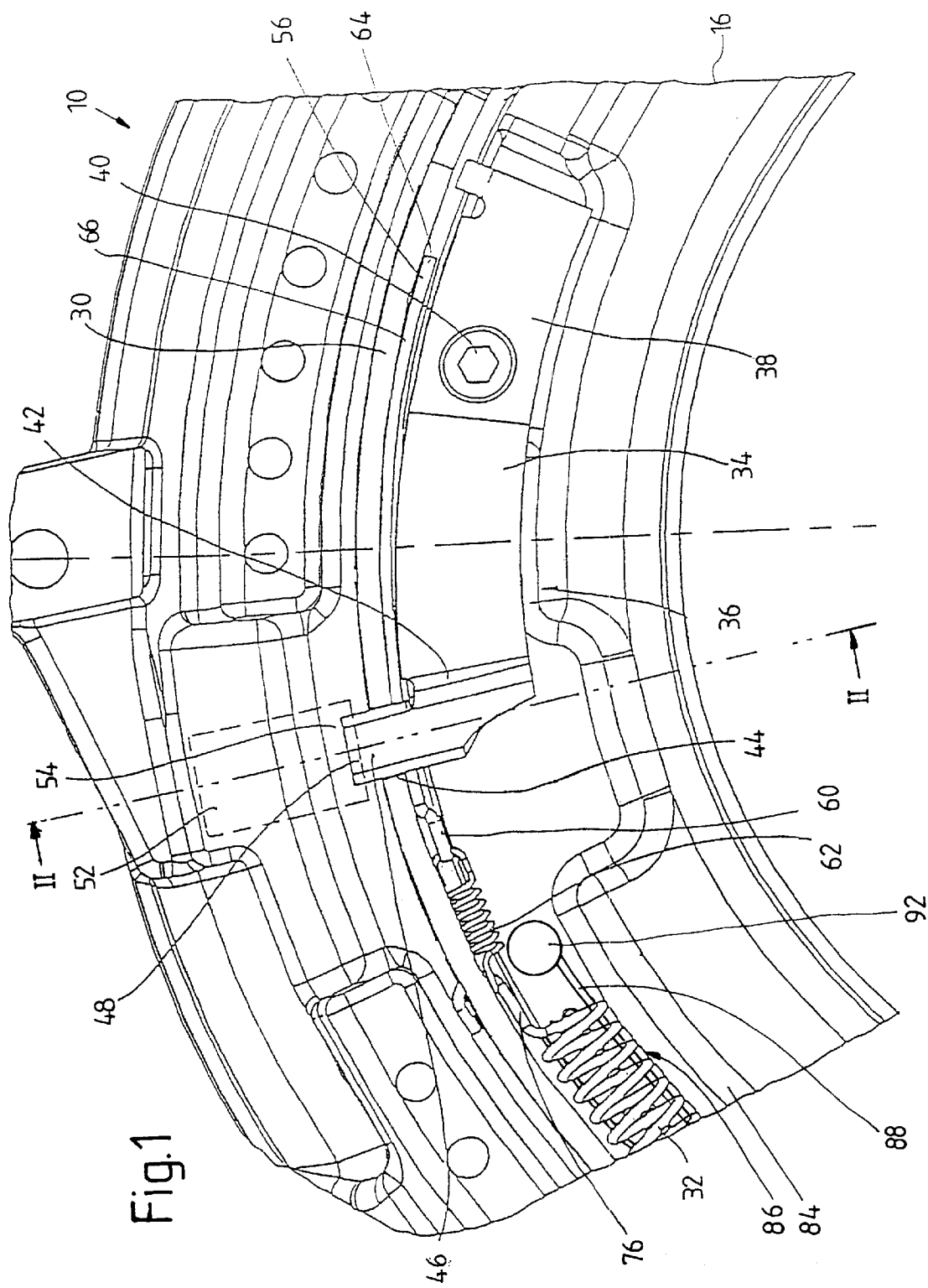
FIG. 1 is a partial axial view of a pressure plate assembly according to the invention.
Figure 2:
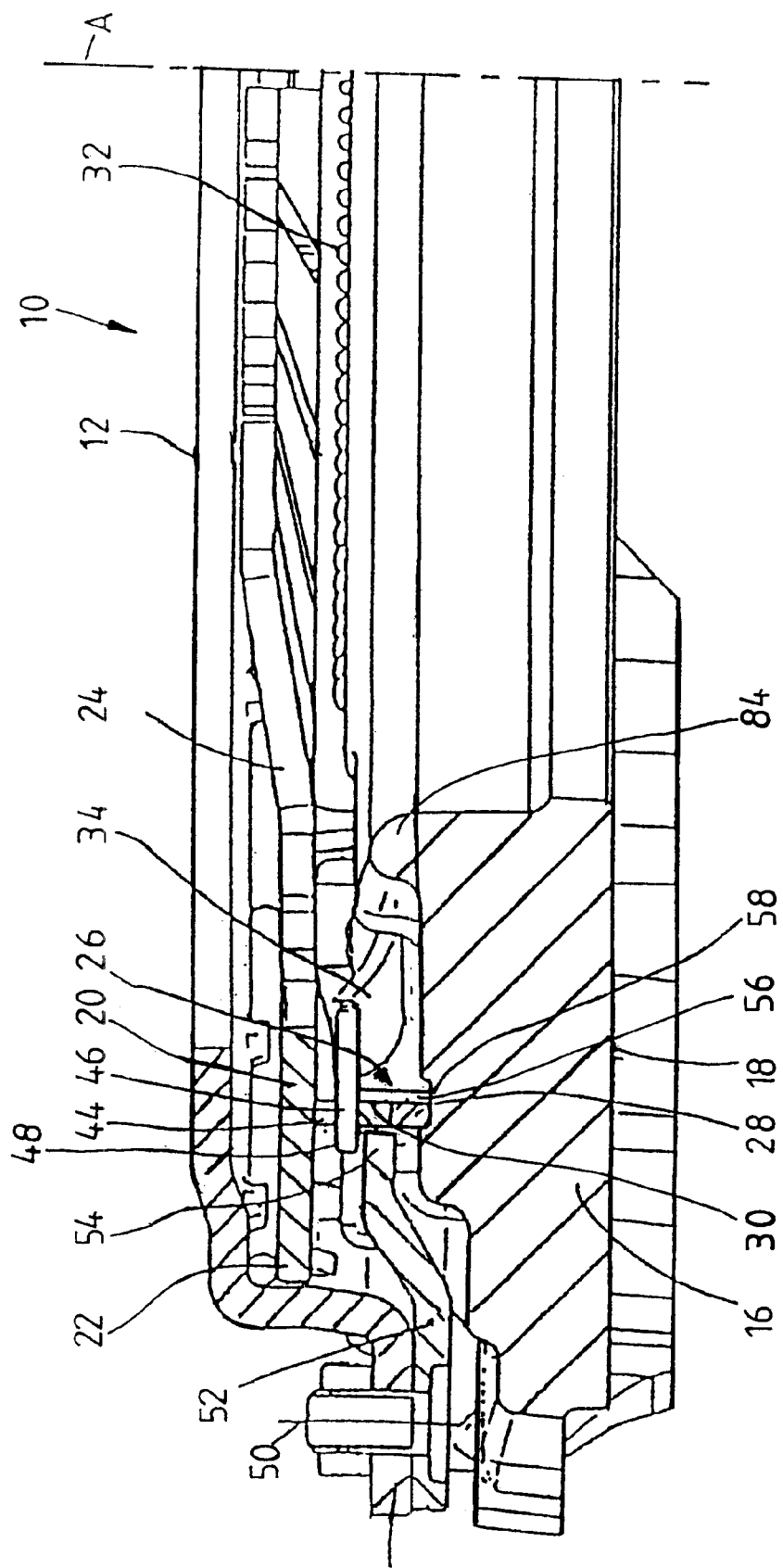
FIG. 2 is a partial longitudinal cross section of the pressure plate assembly according to the invention, taken along line II—II of FIG. 1.

FIGS. 1 and 2 show a pressure plate assembly 10, which comprises a housing 12, which is designed to hold in place a flywheel arrangement such as a single-mass flywheel or possibly a multiple-mass flywheel. Inside the housing 12, a pressure plate is provided, which is designated 16 overall, the friction surface 18 of which can be pressed against a clutch disk, also not shown in the figures, this having the effect of pressing the clutch disk against a corresponding friction surface of the flywheel arrangement. The pressure plate 16 is connected to the housing 12 by elements (not shown) such as tangential leaf springs or the like so that it can move in the same direction as that in which the rotational axis A extends but is essentially unable to rotate around the rotational axis A relative to the housing 12.

A stored-energy element, designated 20 overall, is also provided in the housing 12. The radially outer area 22 of this element is supported against the housing 12, whereas the radially inner part, in the area of so-called elastic tongues 24, is design to be actuated by a release mechanism of the pull type; the part radially in the middle acts on the pressure plate 16 by way of a wear-compensating device 26, to be described below. It should be pointed out here that the stored-energy element 20 and the pressure plate assembly 10 of the pull type are described only by way of example. It is obvious that the stored-energy element 20 could also be supported on the housing 12 radially inside the area where it acts on the pressure plate 16 by way of the wear-compensating adjusting device 26 and thus be designed to cooperate with a release mechanism of the push type.

In the illustrated exemplary embodiment, the wear-compensating device 26 comprises two adjusting rings 28, 30. The adjusting ring 28 is supported on the pressure plate 16, and the adjusting ring 30 is provided to accept the force exerted by the stored-energy element, i.e., by the diaphragm spring 20. The surface areas of the two adjusting rings 28, 30 which rest against each other have complementary slanted or wedge-shaped areas, which are designed with a wedge-like profile extending in the circumferential direction. A relative rotation of the two adjusting rings 28, 30 with respect to each other has the result that the total axial dimension of the wear-compensating device 26 is changed. A helical tension spring provided radially inside the adjusting rings 28, 30 pretensions the two adjusting rings 28, 30 so that they try to turn relative to each other. One end of the spring 32 acts on the adjusting ring 28, while the other end acts, for example, on the pressure plate 16.

A gripping element 34 of a clearance-producing arrangement, designated 36 overall, is also provided radially inside the adjusting rings 28, 30. The gripping element 34 is fastened to the pressure plate 16 at one of its circumferential ends 38 by a threaded bolt 40; at the other circumferential end 42, the gripping element 34 has a gripping section 46, which extends through a circumferential and axial slot 44 in the adjusting ring 30 radially toward the outside. The gripping element 34 is made of elastic material, such as spring plate, and is pretensioned in its installation position in such a way that it exerts force in the axial direction on the adjusting ring 30 and thus on the entire wear-compensating device 26. As a result of this pretensioning effect, the two adjusting rings 28, 30 are clamped between the gripping section 46 and the pressure plate 16, so that not even the pretensioning effect of spring 32 can cause the adjusting rings 28, 30 to rotate with respect to each other in such a direction that the total axial dimension of the wear-compensating device 26 is increased.

In its free end area 48, the gripping section 46 of the gripping element 34 extends over a blocking element 52, which is attached to the housing 12 by a threaded bolt 50, for example, which blocking element extends radially toward the inside up as far as the adjusting rings 28, 30. There is therefore a radial overlap between the end 48 and a corresponding end area 54 of the blocking element 52, as can be seen in FIG. 1.

The gripping element 34 of the clearance-producing arrangement 36, furthermore, is also provided with an arresting element, designated 56 overall. This arresting element is located radially inside the adjusting rings 28, 30 and/or rests against their inside circumferential surface and is guided in an appropriate recess 58 in the pressure plate 16, in which the adjusting ring 28 resting on this pressure plate 16 is also guided. A second helical tension spring 62 acts on one the circumferential ends 60 of the arresting element 56, whereas the other end of the spring is attached or hooked to the helical tension spring 32, namely, at the end of the helical tension spring at which it cooperates with the adjusting ring 28, which, as will be described below, can rotate around the rotational axis A. The adjusting ring 30 is prevented from rotating in the circumferential direction by the gripping element 34, i.e., by the gripping section 46 engaged in the slot 44. Starting from its end area 60 and proceeding to its free end 64, the axial dimension of the arresting element 56 increases; that is, the arresting element has a wedge-like shape extending in the circumferential direction between the ends 60, 64, so that the smallest axial dimension is present in the area in which, in FIG. 1, the gripping section 46 is positioned above the arresting element 56, whereas the largest axial dimension is present in the area at the end 64. Through the action of the spring 62, the arresting element 56 is put under pretension in the circumferential direction, and it moves until its wedge-like surface 66 strikes the gripping section 46 of the gripping element 34 and cannot move any farther in the circumferential direction.

The way in which the pressure plate assembly 10 according to the invention works in rotational mode, especially when wear occurs, is described in the following.

In the new, as yet unworn state of the friction linings normally provided on the clutch disk, the two adjusting rings 28, 30 assume a predetermined relative rotational position when the pressure plate assembly 10 is assembled; in this predetermined position, the axial dimension of the wear-compensating device 26 is also the smallest because of the corresponding relative positioning of the slanted surface areas. In this position, furthermore, the spring 32 is under maximum pretension.

In this state, then, as already described, the adjusting rings 28, 30 are arrested with respect to each other by the pretensioning effect of the gripping element 34 and thus unable to rotate. In the engaged state, furthermore, the stored-energy element 20 is acting on the adjusting ring 30, with the result that the pressure plate 16, which in this situation is resting against the clutch disk, and the resulting opposing force provide another blocking effect on the two adjusting rings 28, 30, which also prevents them from moving. The blocking effect provided by the stored-energy element 20 is much stronger, however, because the stored-energy element 20 exerts a force much greater than the pretensioning force of the gripping element 34.

In this new state of the pressure plate assembly 10, it is also possible for the end section 48 of the gripping section 46 to be a certain axial distance away from the opposing end section 54 of the blocking element 52.

When now the friction linings become worn during operation, e.g., after repeated engagements and disengagements, the pressure plate 16 comes closer and closer to the flywheel arrangement when in the engaged state, which, in the illustration of FIG. 2, corresponds to a movement of the pressure plate 16 in the downward direction relative to the housing 12. As this happens, the end section 48 of the gripping section 46 also moves closer to the blocking element 52. As soon as the amount of wear exceeds a certain value, the gripping section 46 is prevented from moving any farther by the blocking element 52. When additional wear then occurs, therefore, the gripping section 46 will be restrained in the axial direction by the blocking element 52 as the clutch is being engaged and thus lifted away from the adjusting ring 30 as the pressure plate 16 continues to move in the axial direction. A certain amount of axial clearance is thus created between the gripping section 46, which had previously being resting against the adjusting ring 30, and this adjusting ring 30. Because the stored-energy element 20 is still exerting its force on the adjusting rings 28, 30 during the clutch-engaging process and then in the engaged state, as described above, it is still impossible for any relative rotational motion to occur between the two adjusting rings 28, 30, even though the gripping element 34 is no longer exerting any blocking action. In the state in which the further movement of the gripping section 46 is blocked, the gripping section 46 would then in principle be forced to lose contact with the wedge surface 66 of the arresting element 56. But because this arresting element 56 is under the pretension of the spring 62, this element is pulled into the gap which forms as soon as the rising movement of the gripping section 46 begins. The result of this is that, when a clutch-disengaging operation now occurs, in the course of which the end section 48 of the gripping section 46 rises axially again from the blocking element 52, the gripping section 46 is unable to make contact again with the wear-compensating device 26, which is still being prevented by the stored-energy element 20 from making an adjusting movement. Initially, therefore, at the beginning of the disengaging process, the clearance between the gripping section 46 and the adjusting ring 30 previously produced by wear remains.

During a subsequent clutch-disengaging process, however, the clamping action of the two adjusting rings 28, 30 relative to each other essentially disappears as a result of the elimination or reduction of the actuating force of the stored-energy element 20; whatever clamping force remains is provided at this point almost exclusively by the tangential leaf springs responsible for the return of the pressure plate 16. The axial pretensioning force of these springs, however, is comparatively weak. The adjusting ring 28 is therefore now able to move in the circumferential direction under the action of the helical tension spring 32; the adjusting ring 30 is prevented from moving in the circumferential direction by the gripping element 34. During this relative rotation between the two adjusting rings 28, 30 and the accompanying sliding movement of the various slanted surface areas along each other, the wear-compensating device 26 changes its axial dimension until the adjusting ring 30 comes to rest again against the gripping section 46. The axial dimension of the wear-compensating device 26 has thus been changed essentially to the same extent as that to which the gripping section 46 was previously raised from the adjusting ring 30, this distance corresponding in turn essentially to the extent to which the pressure plate 16 has moved closer, as a result of wear, to the flywheel arrangement in the engaged state. This means ultimately that, when a compensation process such as this has been completed, the wear which has been compensated is essentially the same as that to which the clearance-producing device 36 responded previously. The result is that the axial distance between the friction surface 18 of the pressure plate 16 and the area or point at which the stored-energy element 20 acts on the wear-compensating device 26 has been increased to the same extent that the thickness of the friction lining has decreased. The installation position of the stored-energy element therefore remains unchanged, even after wear has occurred, and thus there will be no change in the engaging or disengaging force characteristic in this type of pressure plate assembly.

Hooking the spring 62 onto the end of the spring 32, which works together with the moving adjusting ring 28, has the result that, even under increasing wear and increasing circumferential movement of the arresting element 56, the spring 62 does not relax to any significant degree. Instead, it is ensured that the spring 62 is put under tension again by the movement of the adjusting ring 28 which occurs as part of the compensation process—the arresting element 56 being held stationary at this time, so that, when more wear occurs, essentially the same amount of pretensioning force is still available to the arresting device for movement in the circumferential direction.

It should be pointed out that, in principle, the design of the pressure plate assembly with wear compensation which has been described above can be modified in a wide variety of ways. For example, it is possible for the wear-compensating device 26 to have only a single adjusting ring, which, when wear occurs and a compensation process is being performed, can move in the circumferential direction around rotational axis A; the slanted surface areas provided on it thus slide along complementary slanted surface areas on the pressure plate. It is also possible to provide several wear-compensating elements which are capable of moving independently of each other and which do not necessarily have to be in the form of rings. Individual wedge elements, which are actuated by associated spring arrangements and which cooperate with separate gripping elements, could also be provided.

Figure 3:
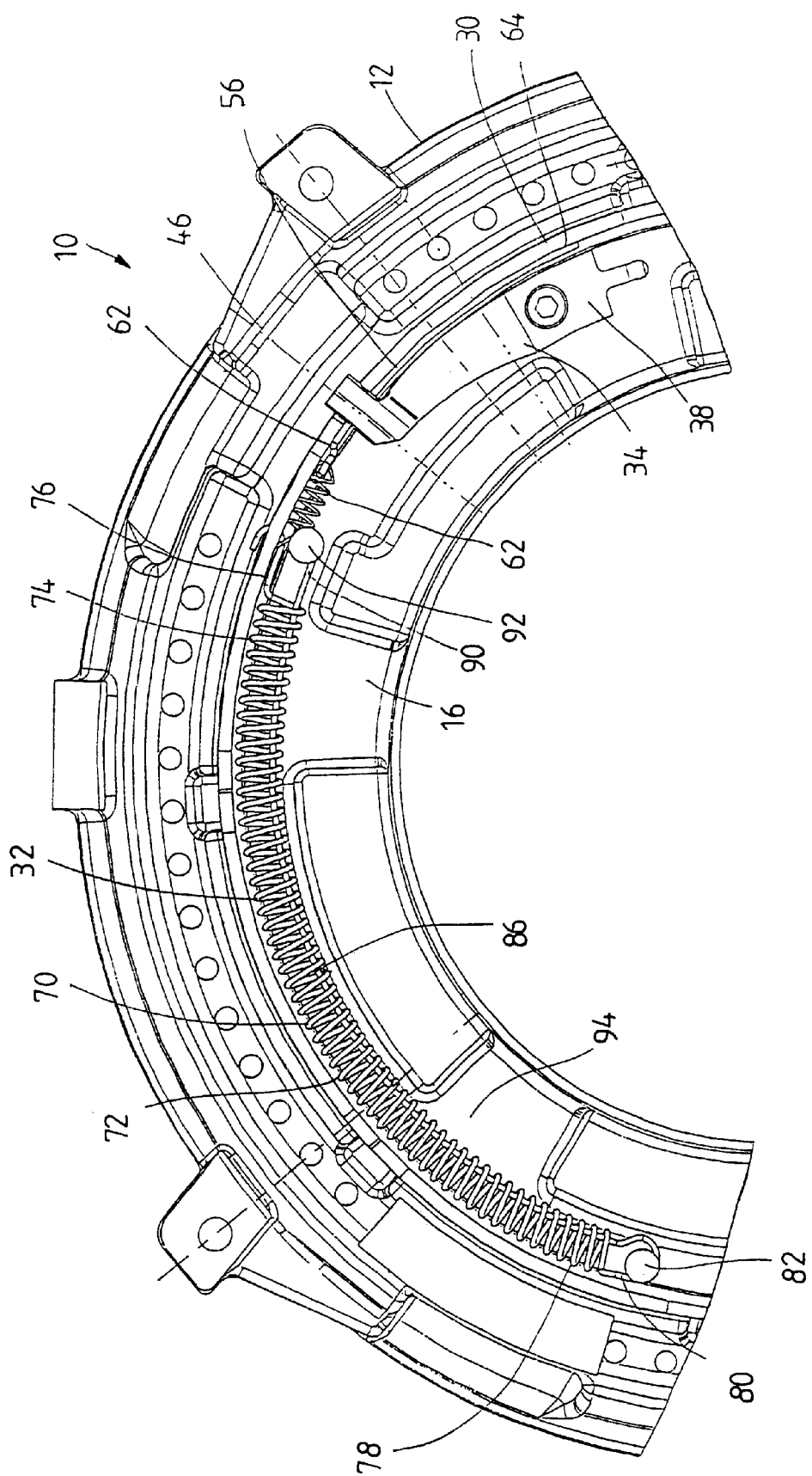
FIG. 3 is a view similar to that of FIG. 1 depicting of the pretensioning spring.

FIGS. 3–5 show the design of the helical tension spring 32 serving to pretension the wear-compensating device 26. This helical tension spring 32 comprises a helical spring body, designated 70 overall, in which a plurality of turns 72 is provided. In a first end section 74 of the helical spring body 70, a first connector 76 with a hook-like shape is provided, which is inserted or hooked into a corresponding hole in the adjusting ring 28, for example, and to which, furthermore, the spring 62 is hooked. At the second end 78 of the helical spring body 70, the spring 32 is attached by a second connector 80, which also has a bent or hook-like contour, to the pressure plate 16 or to a connecting projection or a connecting stud 82 provided thereon. In the example shown, therefore, the spring 32 acts between the wear-compensating device 26, that is, the adjusting ring 28 of same, and the pressure plate 16 to obtain the desired pretension of the adjusting ring 28 for movement in the circumferential direction relative to the rotational axis A. It can also be seen especially in FIG. 2 that a support bead or projection 84 is formed on the pressure plate 16 radially inside the spring 32 when under tension in the installed state, which support bead or projection takes care of keeping the spring 32 curved when in the installed state.

To prevent the spring from coming to rest against the radially inside surface of the wear-compensating device 26 under the effect of centrifugal force when the clutch is operating in rotational mode, furthermore, this spring 32 is provided with support arrangement, designated 86 overall. This support arrangement 86, however, is designed as an integral part of the spring 32; that is, it is formed out of the same piece of material from which the helical spring body 70 with its turns 72 is made. That is, a material section 88, which starts from the second connector 80 and which is formed as an integral part of, i.e. of the same material as, connector 80, passes through the helical spring body 70 in the longitudinal direction. When the spring 32 is in the relaxed state shown in FIGS. 4 and 5, it extends out beyond the first connector 76 in a long run extending therefrom. The material section 88 is essentially long and straight and has at the end facing away from the second connector 80, a third connector 90 at the end of the material section run. As can be seen in FIGS. 1 and 3, the material section 88 is hooked by this third connector 90 to a connecting projection or connecting stud 92 also provided on the pressure plate 16.

As can be seen in FIGS. 3 and 5, the material section 88 starts from the second connector 80 and extends from there through the inside of the helical spring body 70 in such a way that, in the installed state, it extends along the radially inner area 94—relative to rotational axis A—of the helical spring body 70. This means that, under the action of centrifugal forces, the inside surface of the turns of the helical spring body 70, on the radially inner side 94, comes to rest immediately against the material section 88. Because the material section 88 between the two connecting projections 82, 92 is essentially rigid, the helical spring body 70 is provided with immediate support against moving radially toward the outside. In this way, it is possible to prevent the helical spring body 70 from pressing too strongly against the inside surfaces of the adjusting rings 28, 30.

In the pressure plate assembly according to the invention, therefore, simple constructive measures, which are provided essentially only in the area of the spring 32 which pretensions the compensating device 26 for making adjusting movements, prevent this spring 32 from pressing against the wear-compensating device 26 under the effect of centrifugal force. The only measure to be taken which involves the pressure plate is to provide the additional connecting projection 92, but this has no effect on any other design area of the pressure plate or on any of the rest of the pressure plate assembly. In addition, the measures according to the invention for the radial support of the spring also take up less space, primarily because of the use of fewer parts, and do not lead to an increase in the total weight of the pressure plate assembly according to the invention.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A pressure plate assembly for a friction clutch, comprising:
    a housing having a rotational axis;
    a pressure plate mounted in the housing and moveable axially in said housing;
    a stored energy element mounted in the housing and transmitting force along a path from said housing to said pressure plate; and
    a wear-compensating device acting in the path of force transmission, said wear-compensating device including at least one adjusting element moveable in an adjusting direction to compensate for wear, and at least one spring element for pretensioning said adjusting element for movement in said adjusting direction, at least certain areas of said spring element extending in a circumferential direction relative to said rotational axis, said spring element comprising a first connector at a first end of said spring body, a second connector at an opposite second end of said spring body, and a material section extending from said second connector through said helical spring body, said material section being an integral structure part of said spring element.

2. A pressure plate assembly according to claim 1, wherein said material section extends from said second connector through helical said spring body and beyond said first connector to a tip end and a third connector at said tip end.

3. A pressure plate assembly in accordance with claim 1, wherein said material section extends beyond said first connector to a tip end facing away from said second end, said spring element further comprising a third connector at said tip end.

4. A pressure plate assembly in accordance with claim 3, wherein said second and third connectors are connected to a common assembly component.

5. A pressure plate assembly in accordance with claim 1, wherein said adjusting element comprises an adjusting ring positioned for shifting in a circumferential direction around said rotational axis for providing wear-compensating adjustment, said helical spring body extending in said circumferential direction one of along and proximal said adjusting ring.

6. A pressure plate assembly in accordance with claim 5, wherein said spring element is located radially inside said adjusting ring, said material section of said spring element extending relative to said rotational axis, along a radially inside area of said spring body.

7. A pressure plate assembly in accordance with claim 1, wherein said wear-compensating device acts between said pressure plate and said stored-energy element, said spring element being connected to said adjusting element, said spring element second connector being connected to said pressure plate.

8. A pretensioning spring for a pressure plate assembly, said pressure plate assembly including a wear-compensating device, comprising:
    a helical spring body;
    a first connector at a first end of said body;
    a second connector at a second opposite end of said body;
    a material section extending from said second connector through said helical spring body and beyond said first connector, to a tip end; and
    a third connector at said tip end, wherein said first connector, said second connector, said material section, and said third connector are formed integrally with said spring body.

* * * * *